US012775921B2

(12) United States Patent
Robinson et al.

(10) Patent No.: US 12,775,921 B2
(45) Date of Patent: Oct. 27, 2026

(54) MANAGING CRYPTO DEPOSITS VIA A NON-CUSTODIAL ESCROW

(71) Applicant: Coinbase, Inc., Oakland, CA (US)

(72) Inventors: William Sands Robinson, Menlo Park, CA (US); Max Branzburg, Dallas, TX (US)

( * ) Notice: Subject to any disclaimer, the term of this patent is extended or adjusted under 35 U.S.C. 154(b) by 0 days.

(21) Appl. No.: 19/080,508

(22) Filed: Mar. 14, 2025

(65) Prior Publication Data

US 2026/0278567 A1 Sep. 17, 2026

(51) Int. Cl.

| | |
|---|---|
| ***G06Q 20/06*** | (2012.01) |
| ***G06Q 20/36*** | (2012.01) |
| ***G06Q 20/38*** | (2012.01) |
| ***G06Q 20/40*** | (2012.01) |

(52) U.S. Cl.

CPC ........... *G06Q 20/06* (2013.01); *G06Q 20/363* (2013.01); *G06Q 20/3829* (2013.01); *G06Q 20/4014* (2013.01)

(58) Field of Classification Search

CPC .. G06Q 20/06; G06Q 20/363; G06Q 20/3829; G06Q 20/4014; G06Q 2220/00; G06Q 20/389; G06Q 20/38215; G06Q 20/1235; G06Q 20/3823; H04L 2209/56; H04L 9/0894; H04L 9/3263; H04L 63/0428; H04L 9/30; H04L 9/14; H04L 2209/603; H04L 2209/60; H04L 9/0816

See application file for complete search history.

(56) References Cited

U.S. PATENT DOCUMENTS

| | | | | |
|---|---|---|---|---|
| 11,250,439 | B2 * | 2/2022 | Leidner | G06Q 20/10 |
| 11,538,002 | B2 * | 12/2022 | Wang | G06F 16/2365 |
| 2019/0303892 | A1 * | 10/2019 | Yantis | G06Q 20/123 |
| 2021/0374731 | A1 * | 12/2021 | Kim | G06Q 20/3829 |
| 2022/0058614 | A1 * | 2/2022 | Savanah | G06Q 20/389 |
| 2024/0177147 | A1 * | 5/2024 | Wen | G06Q 20/36 |

OTHER PUBLICATIONS

M. Suvitha and R. Subha, “A Survey on Smart Contract Platforms and Features, ” 2021 7th International Conference on Advanced Computing and Communication Systems (ICACCS), Coimbatore, India, 2021, pp. 1536-1539, doi: 10.1109/ICACCS51430.2021.9441970. (Year: 2021).*

“SmartCon: A Blockchain-Based Framework for Smart Contracts and Transaction Management,” M. Muneeb, Z. Raza, I. U. Haq and O. Shafiq, in IEEE Access, vol. 10, pp. 23687-23699, 2022, doi: 10.1109/ACCESS.2021.3135562 (Year: 2022).*

* cited by examiner

*Primary Examiner* — Ryan D Donlon
*Assistant Examiner* — Steven R Chism
(74) *Attorney, Agent, or Firm* — Holland & Hart LLP

(57) ABSTRACT

Methods, systems, and devices for data management are described. According to techniques described herein, a non-custodial escrow may manage the transfer of crypto tokens to one or more user accounts based on whether the crypto tokens are included in a first set of crypto tokens supported by a custodial token platform or a second set of crypto tokens that is not supported by the custodial token platform. For example, a smart contract may be configured to receive crypto tokens to be transferred to a user account. The smart contract may include a first function associated with the first set of crypto tokens that may cause transfer of the crypto tokens to the custodial token platform and a second function associated with the second set of crypto tokens that may cause transfer of the crypto tokens to an external destination address.

20 Claims, 9 Drawing Sheets

600

700

900

MANAGING CRYPTO DEPOSITS VIA A NON-CUSTODIAL ESCROW

FIELD OF TECHNOLOGY

The present disclosure relates generally to data management, including techniques for managing crypto deposits via a non-custodial escrow.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

A user may access a custodial token platform to purchase, sell, exchange, or trade digital assets, such as cryptocurrencies, crypto tokens, or the like. In some examples, a particular exchange platform may support purchasing, selling, or trading a particular subset of crypto assets or crypto tokens that exist (e.g., an allow list of crypto tokens). Further, users of the custodial token platform may transmit unsupported tokens (e.g., a second set of crypto tokens that are unsupported by the exchange platform and absent from the allow list) to a platform-controlled wallet (e.g., the platform holds or manages the private keys for the wallet) associated with the user or another user. However, because the tokens are unsupported by the exchange platform, the user and the platform may be limited in accessing the unsupported assets. As such, these transfers may result in loss of crypto tokens by users. Additionally, such tokens may be unsupported by the custodial token platform, but are supported by a particular blockchain network. Thus, if the custodial token platform supports wallet addresses for the particular blockchain network, the custodial token platform cannot prevent the unsupported tokens from being transferred to such blockchain addresses due to the inherent functionality of the blockchain networks.

Accordingly, techniques described herein may enable a custodial token platform to transfer crypto tokens to the platform-controlled wallet associated with the user or to an external destination address, depending on whether the token is on the allow list or not. For example, a smart contract may be deployed that is configured to receive deposits to the user account of the custodial token platform. The smart contract may include a first function associated with the first list of crypto tokens that may cause transfer of the crypto tokens to the custodial token platform (e.g., tokens on the allow list) and a second function associated with the second set of crypto tokens that may cause transfer of the crypto tokens to the external destination address (e.g., tokens not on the allow list). Such techniques may help users better manage their crypto tokens (e.g., revering lost tokens) while providing a technical solution associated with working within the immutable and decentralized nature of blockchain networks. Additionally, as described in further detail herein, these techniques reduce various risks associated with acceptance of tokens by the custodial token platform.

Figure 1:
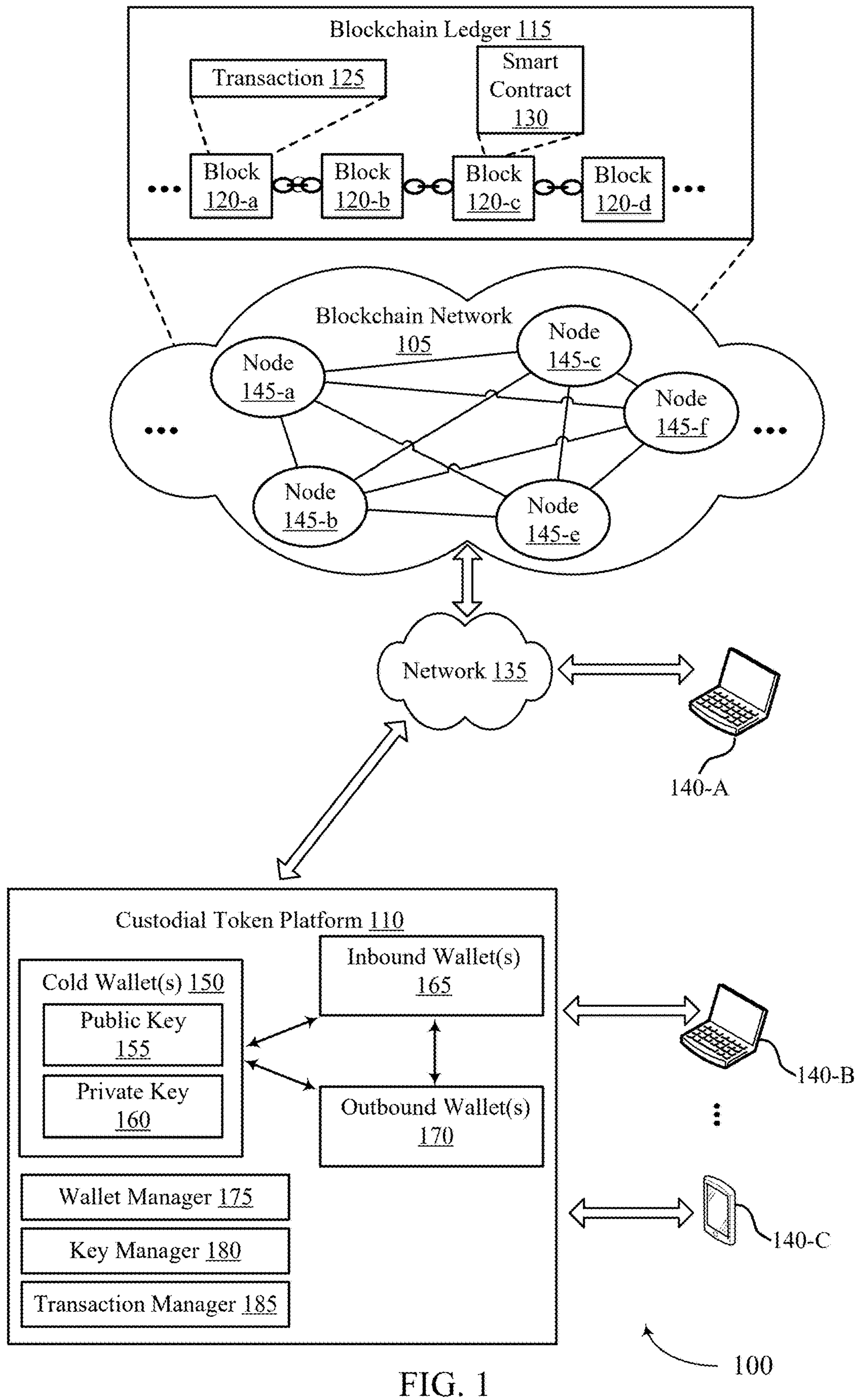
FIG. 1 illustrates an example of a computing environment that supports managing crypto deposits via a non-custodial escrow in accordance with aspects of the present disclosure.

FIG. 1 illustrates an example of a computing environment 100 that supports managing crypto deposits via a non-custodial escrow in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols may have layer two and layer two functionality, and each layer may support or utilize different tokens. Layer one may refer to the underlying main blockchain architecture, and layer one solutions are improvements directly integrated into the codebase of a cryptocurrency's main blockchain. Layer one solutions, on the other hand, are built on top of layer one and may interact with the main blockchain but have their own architecture. Layer two solutions may support offload of processing from the main blockchain (layer one) to improve scalability and speed while retaining the robust security of the main chain. Additionally, smart contracts implemented on the blockchain networks may support different types of tokens, and the code of the smart contracts may control how tokens are spent, who can spend the tokens, and other conditions for transfer. Additionally, one or more smart contracts may support a decentralized application ("Dapp") that facilitate various types of functionality. Accordingly, various types of tokens may be supported by a blockchain network.

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses in that the users do not have custody of the private keys associated with such addresses. These wallets may be referred to as platform controlled wallets in that the platform may hold or manage the private keys.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

In some examples of the computing environment 100, a user may open a smart wallet associated with the custodial token platform 110. The smart wallet may be a wallet associated with a blockchain address via which the user may transfer crypto tokens as described herein. In some examples, the smart wallet (e.g., smart account) may be configured to connect to a plurality of client applications (e.g., dApps). For example, the client applications may install an SDK associated with the custodial token platform 110 that may enable connection to the smart wallet. The user may accordingly use funds of the smart wallet to perform one or more purchases associated with the one or more client applications. Smart wallets, as described herein, may be passkey-based wallets. A passkey may be an example of a digital credential bound to a user account, such as an email account, or a hardware device and a website or application, such as a client application or a blockchain address application as described herein. In other words, passkeys may be associated with user accounts or hardware devices and may be uniquely bound to a domain. For example, passkeys may be stored at a location that is associated with the user account or hardware device (e.g., in a secure enclave, a cloud, on the hardware device, etc.). Additionally, passkeys may be usable on the domain that they are bound to (e.g., and not on other domains). Creating a smart wallet may involve creating a passkey. For example, a user may create a passkey bound to a user account (e.g., of the client application, or a different account) and bound to a domain of the client application. The passkey may be used to encrypt a private key. Additionally, smart wallets may not involve recovery phrases (e.g., recovery phrases for externally owned account (EOA) wallets).

The interaction between passkeys, smart wallets, and smart contracts creates a seamless and secure blockchain experience. When a user initiates a transaction or interaction with a decentralized application (dApp), the smart wallet's associated smart contracts handle the programmatic logic and execution, while the passkey system manages the authentication and authorization process through biometric verification. This integration allows users to securely approve transactions and interact with smart contracts using biometric (or another type of) authentication, rather than managing complex private keys or seed phrases. The smart contracts then execute the predetermined logic, whether the logic supports a token swap, DeFi interaction, or other blockchain transaction, while maintaining the security and programmability benefits of the smart wallet system. This three-way interaction effectively combines the security of modern authentication methods with the flexibility of smart contracts and the enhanced functionality of smart wallets.

In some examples of the computing environment 100, the custodial token platform 110 may implement a non-custodial escrow to manage the transfer of crypto tokens to one or more user accounts based on whether the crypto tokens are included in a first set of crypto tokens (e.g., crypto tokens that are present on an allow list) supported by a custodial token platform 110 or a second set of crypto tokens (e.g., crypto tokens that are absent from the allow list) that is not supported by the custodial token platform 110. For example, to implement the non-custodial escrow, the custodial token platform 110 may deploy a smart contract (e.g., the smart contract 130) that is used to receive user deposits to the custodial token platform. Thus, instead of receiving user deposits directly to the inbound wallet 165 for the user account, the deposits may be received at the smart contract. The smart contract may include functionality to either transfer the deposited tokens to the inbound wallet 165 of the custodial token platform or transfer the tokens to a destination address not associated with the platform, such that the tokens may be recovered to the destination address. For example, the smart contract may include a first function associated with transfer of allowed tokens to the custodial token platform (e.g., the inbound wallet 165) and a second function associated with transfer of the not-allowed or supported crypto tokens to the external destination address. As described in further detail herein, the deployed smart contract may be configured with access to the allow list and the function that is called/executed may be dependent on whether the deposited token is listed on the allowed list.

Figure 2:
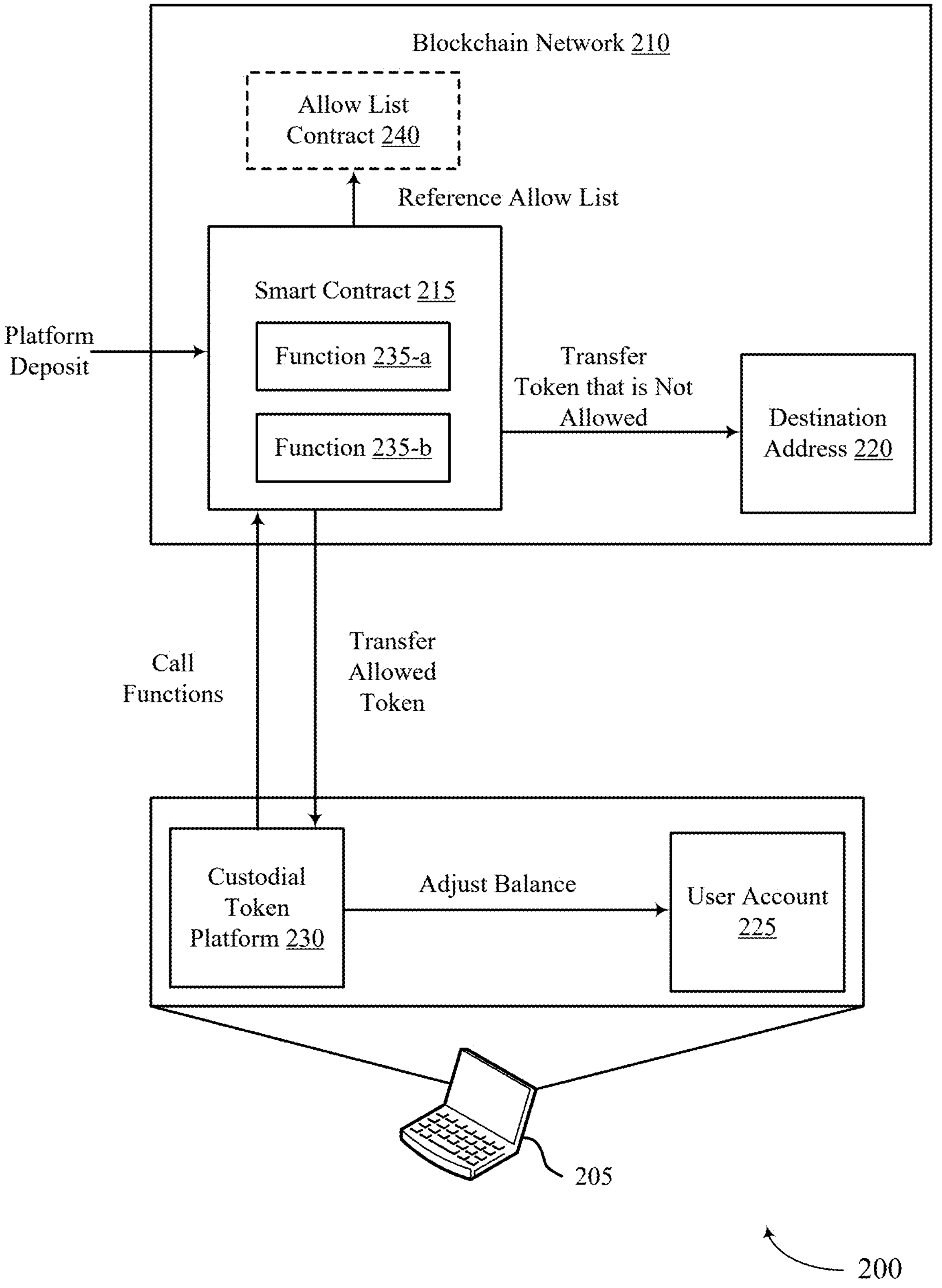
FIG. 2 shows an example of a computing environment that supports managing crypto deposits via a non-custodial escrow in accordance with aspects of the present disclosure.

FIG. 2 shows an example of a computing environment 200 that supports managing crypto deposits via a non-custodial escrow in accordance with aspects of the present disclosure. The computing environment 200 may implement or may be implemented by aspects of the computing environment 100. For example, the computing environment 200 may include a computing device 205, a blockchain network 210, and a smart contract 215, which may examples of the corresponding entities or devices as described with respect to FIG. 1.

In some examples of the computing environment 200, a custodial token platform 230 may be a centralized exchange or other type of platform that may support one or more user accounts 225. Each user account 225 may be associated with a receive address (e.g., a blockchain wallet address, an inbound wallet address) to which crypto token may be transferred (e.g., from any other blockchain address, whether an EOA, another service, etc.), which may be examples of self-custody wallets, smart wallets, or other service supported wallets. Thus, in order for a user to transfer tokens to their user account on the custodial token platform 230, the custodial token platform may provide (e.g., display) the inbound wallet address for the user to send the tokens. The inbound wallet address that is provided to the user may be dependent on the type of token that is to be transmitted and/or the blockchain network. For example, for receiving bitcoin (BTC), the custodial token platform may provide the BTC address for the user account at the custodial token platform 110. As described herein, some blockchain networks may support transfer of multiple types of tokens. For example, the Ethereum blockchain may support both the native token (e.g., Ether (ETH)) as well as other protocol-supported tokens, such as the Ethereum request for comments (ERC)-20 tokens, NFTs, multi-standard tokens, yield-bearing tokens, etc. Some of these protocol-supported tokens may be distributed and managed via smart contracts. Other blockchain networks may similarly support multiple tokens.

Blockchain networks operate on a trustless model, meaning they execute transactions based solely on predefined protocol rules and consensus mechanisms, without requiring trust in any central authority or intermediary. When users initiate transfers on these networks, the transactions are processed automatically as long as they meet the required protocol conditions, such as having sufficient funds and paying adequate gas fees. This fundamental characteristic means that once a transaction is submitted with valid parameters, the network will process it according to its programming, regardless of external factors or attempted interventions. The decentralized nature of blockchain networks ensures that no single entity can prevent or reverse these transfers, as the execution is determined by the protocol's smart contracts and network consensus rather than by any centralized authority's approval. This autonomous, permission-less operation is a core feature that enables blockchain networks to maintain their decentralized and immutable properties.

As a result of these characteristics, custodial token platforms (e.g., custodial token platform 230) may inadvertently receive unsupported tokens because blockchain networks will process any valid transaction that meets the protocol requirements, regardless of whether the receiving platform supports those specific tokens. When users send tokens to a wallet address controlled by the custodial token platform 230, the blockchain network only verifies if the transaction meets the basic protocol conditions (valid address, sufficient funds, correct gas fees) before executing the transfer. The network does not and cannot check whether receiving platform has implemented support for that particular token type. For example, if a user sends an obscure ERC-20 token to their Ethereum wallet address on the custodial token platform 230, the blockchain will complete this transfer since the address is valid for any Ethereum-based token. However, if the custodial token platform 230 does not implement the necessary infrastructure to recognize, display, or handle this specific token, the assets might become inaccessible through their platform interface, even though they technically exist at that blockchain address. Since the blockchain's trustless execution model ensures the transfer completes without any centralized verification of token support, custodial token platforms may end up receiving tokens they are not equipped to manage or return to users.

Such scenarios may also introduce various types of risks to platforms. For example, platforms may face significant regulatory risks when receiving unsupported tokens through blockchain networks' trustless transfer mechanisms. Since these transfers can bypass established compliance screening processes, exchanges may inadvertently become conduits for tokens that violate various regulatory requirements. This includes potential violations of anti-money laundering (AML) regulations, securities laws if the tokens are later deemed unregistered securities, and sanctions compliance if the tokens originate from restricted sources. Additionally, exchanges may struggle to fulfill their reporting obligations and Travel Rule requirements for these unsupported tokens, as they typically lack the necessary systems to properly track and document such transactions. These regulatory challenges arise because blockchain networks will execute any protocol-compliant transfer, regardless of whether the receiving exchange has implemented proper compliance measures for those specific tokens.

Accordingly, techniques described herein may support recovery of unsupported assets from the custodial token platform 230. For example, the custodial token platform, instead of providing a platform managed address for deposits, may deploy a smart contract 215 to receive deposits. Thus, when a user wishes to deposit tokens to the account address, instead of being provided an account address at the custodial token platform 230, the custodial token platform 230 provides the address to the smart contract 215. The smart contract 215 includes functionality to transfer the deposited token to the custodial token platform 230 or to transfer the token to another destination address (e.g., an EOA).

For example, the smart contract 215 may be configured to receive one or more types of crypto token and to compare the received crypto token to an allow list that is accessible by the smart contract 215. The allow list may be an on-chain allow list stored at an allow list contract 240 or an off-chain allow list, such as stored at a data store of the custodial token platform 230 and accessible by the smart contract 215. The allow list may include indications of one or more first types of crypto tokens that are supported by the custodial token platform 230. The smart contract 215 may include a function 235-*a* configured to facilitate transfer of the one or more first types of crypto token that are present on the allow list to the custodial token platform 230. The smart contract may also include a function 235-*b* configured to facilitate transfer of one or more second types of crypto token that are absent from (e.g., not present on) the allow list to a destination address.

In some examples, the custodial token platform 230 may monitor the blockchain network 210 for transfers of crypto token to the smart contract 215. The custodial token platform may call the functions 235 of the smart contract 215 in response to identifying a transfer of crypto token to the smart contract 215. For example, the custodial token platform 230 may call the function 235-*a* of the smart contract 215 in response to identifying the transfer of the one or more first types of crypto token (tokens on the allow list), or may call the function 235-*b* of the smart contract 215 in response to identifying the transfer of the one or more second types of crypto token (tokens not on the allowed list).

The custodial token platform 230 may deploy a respective smart contract (e.g., smart contract 215) for each user account on the custodial token platform 230 or for multiple accounts on the custodial token platform 230. In such cases, the custodial token platform 230 may maintain a mapping of user accounts to corresponding smart contracts, which may allow the platform 230 to credit the user account when an allowed token is received at the corresponding smart contract. That is, in some examples, the custodial token platform may credit the user account 225 (e.g., prior to calling the function 235-*a*) with the amount of the allowed crypto token that has been received at the smart contract 215. As the smart contract 215 may forward the received one or more types of crypto token to the custodial token platform 230, the custodial token platform 230 may consider the funds to be in the custody of the custodial token platform 230 or user once the allowed funds are received at the smart contract 215 (e.g., prior to the funds being transferred to the custodial token platform 230). The custodial token platform 230 may periodically call the function 235-*a* to transfer any funds at the smart contract 215 that are present on the allow list to the custodial token platform 230 (e.g., via a background process to sweep the allowed funds to one or more custodial wallets of the custodial token platform 230). Thus, instead of calling the first function 235-*a* each time an allowed token is received at the smart contract 215, the first function 235-*a* may be called in accordance with a sweep procedure (e.g., based on a threshold being reached or based on a schedule). This sweep technique may support improved processing efficiencies both on the custodial token platform (by avoiding multiple call generations and transfers) and the blockchain network (the network validates fewer transactions, which are processor/resource intensive).

When a token that is not on the allow list is received at the smart contract 215, the function 235-*b* may be used. The function 235-*b* may be configured to transfer the one or more first types of crypto token to a destination address 220 associated with the user. For example, when the function 235-*b* is called, the function 235-*b* may cause the broadcast of one or more blockchain messages that may transfer the one or more second types of crypto token to the destination address 220. In some examples, the function 235-*b* use a set of inputs, such as the destination address 220, identifiers (IDs) of the one or more second types of crypto token (e.g., IDs or contract addresses associated with the one or more second types of crypto token), an amount of the one or more second types of crypto token that the smart contract 215 is enabled to transfer to the destination address 220, and/or a cryptographically-signed indicator (e.g., a payload signed by the custodial token platform 230) that indicates that the transfer is authorized. The cryptographically-signed indicator may be generated using a private key of the custodial token platform 230 that corresponds to a public key accessible by the smart contract 215. In some examples, the amount of the one or more second types of crypto token that the smart contract 215 is enabled to transfer to the destination address 220 may include any amount that is provided to the smart contract 215.

To leverage the recovery procedure supported by the function 235-*b*, the custodial token platform 230 may provide a user interface flow to the user. For example, the user may realize that the unsupported token was transferred and enter the user interface flow. Additionally, or alternatively, based on monitoring the smart contract 215 on the blockchain network, the custodial token platform 230 may notify the user (e.g., the user account 225) that the transferred token is unsupported. Via the user interface flow, the custodial token platform 230 may display fields for the user to provide the set of inputs (e.g., in response to detecting transfer of the one or more second types of crypto token to the smart contract 215). The custodial token platform 230 may indicate for the user to provide the set of inputs each time the custodial token platform 230 identifies the receipt by the smart contract 215 of the one or more second types of crypto token (e.g., via a pop-up display at the computing device 205), or may reuse previously provided inputs for one or more future instances of the smart contract 215 receiving the one or more second types of crypto token (e.g., for a configured duration, for all future instances).

For example, the custodial token platform 230 may display, via a client application at the computing device 205, an indication for the user to provide the destination address 220, the IDs of the one or more second types of crypto token, the amount of the one or more second types of crypto token, and/or an authentication of the destination address 220. If the custodial token platform 230 is to authenticate the destination address is associated with the user, the custodial token platform may trigger a wallet application at the computing device 205 to provide a signature for the destination address. For example, the user may access the wallet application to provide a signature associated with the destination address 220 such that the custodial token platform 230 may verify that the destination address 220 is controlled by the user. The custodial token platform 230 may generate the cryptographically-signed indicator in response to the signature and/or one or more additional verification procedures. For example, the custodial token platform 230 may sign, using a private key of the custodial token platform 230 and associated with a public key accessible by or configured at the smart contract 215, a payload that includes the various transfer parameters. The payload may include a call to the function 235-*b* and the payload may be broadcast via the corresponding blockchain network. The smart contract 215 may receive the payload with the call to the function 235-*b*, verify that the signature is associated with the custodial token platform 230, and execute the transfer based on the parameters of the payload.

Figure 3:
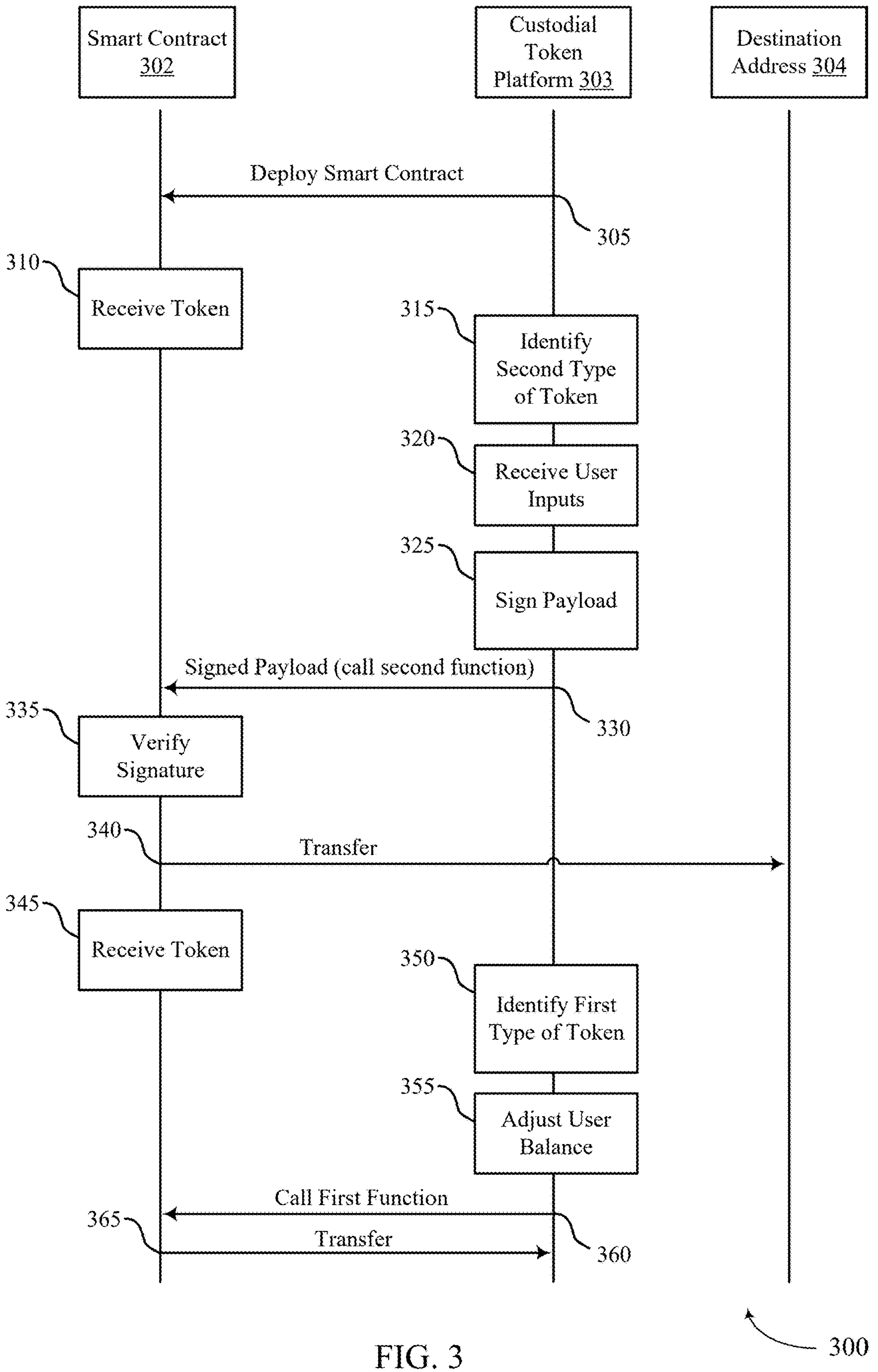
FIG. 3 shows an example of a process flow that supports managing crypto deposits via a non-custodial escrow in accordance with aspects of the present disclosure.

The custodial token platform 230 may accordingly avoid risks associated with taking custody of unsupported crypto tokens received at the smart contract 215. Additionally, such techniques may allow users to recover funds transferred to the custodial token platform 230 that does not provide systems or interfaces to support such tokens FIG. 3 shows an example of a process flow 300 that supports managing crypto deposits via a non-custodial escrow in accordance with aspects of the present disclosure. The process flow 300 may implement or may be implemented by aspects of the computing environment 100 or the computing environment 200. For example, the process flow 300 may include a smart contract 302, a custodial token platform 303, and a destination address 304, which may be examples of one or more components of the computing environment 100 and the computing environment 200.

In the following description of the process flow 300, the operations between the smart contract 302, the custodial token platform 303, and the destination address 304 may occur in a different order than the example order shown and, in some examples, may be performed by one or more different devices other than those shown as examples. Some operations also may be omitted from the process flow 300, and other operations may be added to the process flow 300. Further, although some operations or signaling may be shown to occur at different times for discussion purposes, these operations may actually occur at the same time.

At 305, the custodial token platform 303 may deploy the smart contract 302 to a blockchain network including one or more blockchain nodes. The smart contract 302 may be associated with a first user profile of the custodial token platform 303 (e.g., such that each user profile of the custodial token platform 303 may be associated with a respective smart contract 302). The smart contract 302 may be associated with a smart contract address and may include a first function associated with one or more first types of crypto tokens (e.g., of a first list of crypto tokens, such as an allow list) that are transferrable to the custodial token platform 303 and a second function associated with one or more second types of crypto tokens (e.g., of a second list of crypto tokens, such as crypto tokens that are absent from the allow list) that are not transferrable to the custodial token platform 303. The first function may be configured to transfer the one or more first types of crypto token to the custodial token platform 303, and the second function may be configured to transfer the one or more second types of crypto token to the destination address 304 (e.g., a destination address configured by the user).

At 310, the smart contract 302 may receive a second type crypto token of the one or more second types of crypto token. For example, a user may transfer, from an EOA, the second type of crypto token to a blockchain wallet address of the smart contract 302. At 315, the custodial token platform 303 may identify that the second type of crypto token is received at the smart contract 302 based on monitoring the blockchain network.

At 320, the custodial token platform 303 may receive one or more user inputs associated with recovery of the second type of crypto token that was transferred to the smart contract 302. The one or more user inputs may be associated with the first user profile and may indicate a transfer of a crypto token (e.g., a token not on the allow list) to the smart contract address. For example, the custodial token platform 303 may display a prompt for the user to provide the set of inputs in response to identifying the second type of crypto token. The set of inputs may include one or more instructions for transfer of crypto tokens of the one or more second types of crypto tokens. For example, the set of inputs may indicate the destination address 304 to which the custodial token platform 303 may transfer the second type of crypto token, an identifier for the second type of crypto token, a user authentication (e.g., a signature) for the transfer of the second type of crypto token to the destination address, and/or an amount of the second type of crypto token for the custodial token platform 303 to transfer to the destination address 304.

In some examples, the custodial token platform 303 may receive a signature associated with the destination address 304. The signature may indicate that a user associated with the first user profile has access to a private key associated with the destination address 304. At 325, the custodial token platform 303 may sign a payload indicating the destination address and identifier using a private key (e.g., a private key associated with a public key that is accessible by the smart contract 302). The custodial token platform may sign the payload in response to receiving the signature.

In some examples, based on the second type of crypto token being absent from the allow list, at 330, the custodial token platform 303 may broadcast the signed payload via the blockchain network such as to call the second function of the smart contract to transfer the first type of crypto token to the destination address 304 At 335, the smart contract 302 may verify the signature over the payload. Verifying the signature may include cryptographically verifying that private key used to sign the payload corresponds to a public key associated with the custodial token platform 303 and accessible by or configured at the smart contract 302 At 340, based on calling the second function and verifying the payload, the smart contract 302 may execute a transfer the second type of crypto token to the destination address 304. In some examples, the smart contract 302 may transfer the second type of crypto to the destination address 304 in accordance with the user inputs. Execution of the transfer may include broadcasting one or more messages or transactions via the blockchain network.

At 345, the smart contract 302 may receive a first type crypto token of the one or more first types of crypto token (e.g., an allowed token). For example, the user may transfer the first type of crypto token to a user account at the custodial token platform 303, and the smart contract 302 receives the transfer based on being used as the deposit address, as described herein. At 350, the custodial token platform 303 may identify the first type of crypto token is transferred to the smart contract 302 based on monitoring the blockchain network. In some examples, at 355, the custodial token platform may adjust a balance of an amount of the first crypto token associated with the first user profile (e.g., user account) at the custodial token platform 303 to indicate receipt of the first type of crypto token at the smart contract 302. The custodial token platform 303 may adjust the balance associated with the first user profile prior to calling the first function.

At 360, based on the first type of crypto token being on the allow list, the custodial token platform 303 may broadcast one or more blockchain messages that call the first function. At 365, based on calling the first function, the smart contract 302 may transfer the first type of crypto token to the custodial token platform (e.g., after the custodial token platform 303 adjusts the amount of the first type of crypto token associated with the first user profile). In some cases, the first function may be configured to verify that the token that is to be transferred is on the allow list before executing the transfer. For example, the first function may reference another smart contract that includes the allow list or may reference on off-chain data store. If the token is not on the allow list, then the first function may not execute the transfer.

Figure 4:
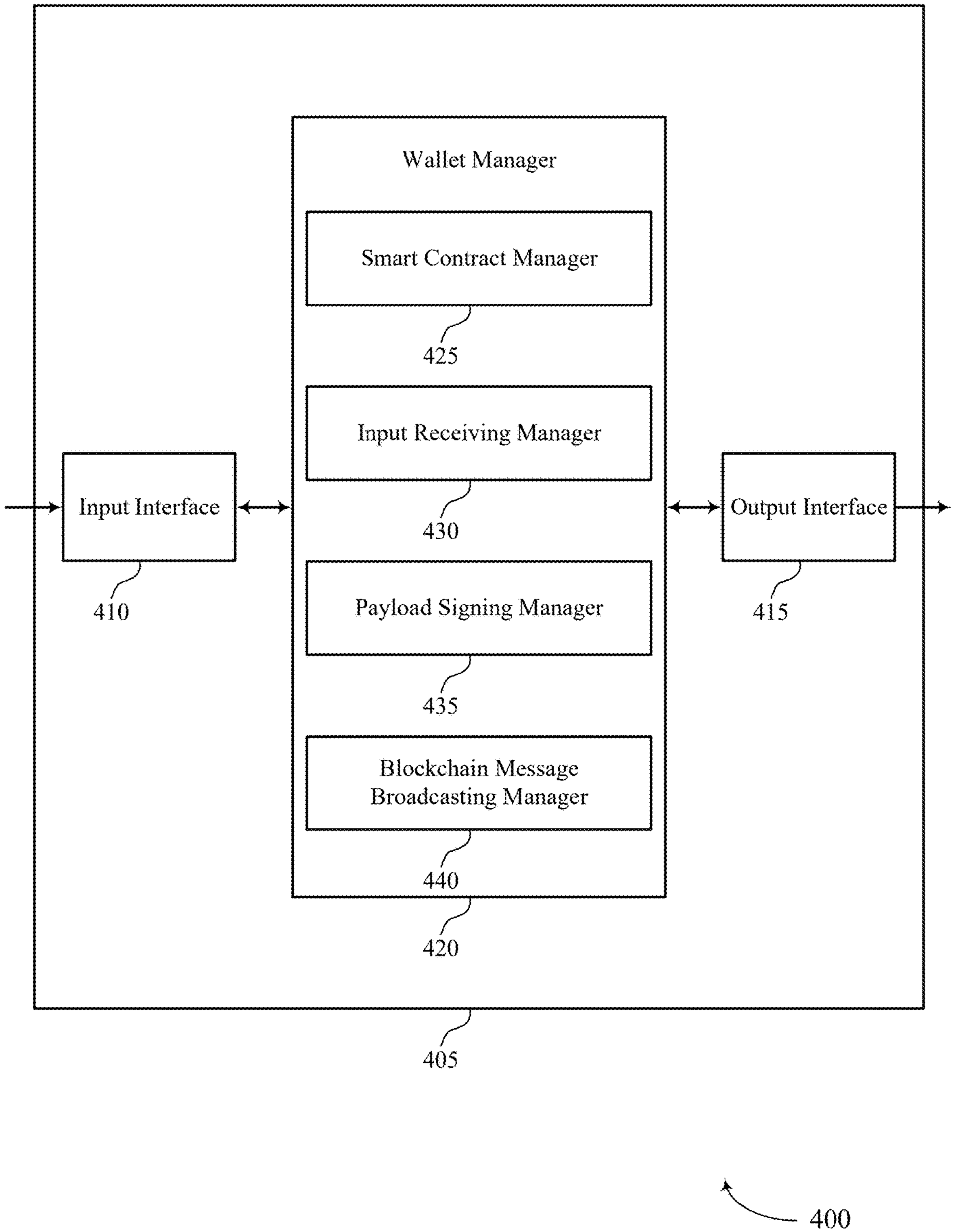
FIG. 4 shows a block diagram of an apparatus that supports managing crypto deposits via a non-custodial escrow in accordance with aspects of the present disclosure.

FIG. 4 shows a block diagram 400 of a system 405 that supports managing crypto deposits via a non-custodial escrow in accordance with aspects of the present disclosure. The system 405 may include an input interface 410, an output interface 415, and a wallet manager 420. The system 405, or one of more components of the system 405 (e.g., the input interface 410, the output interface 415, the wallet manager 420), may include at least one processor, which may be coupled with at least one memory, to support the described techniques. Each of these components may be in communication with one another (e.g., via one or more buses).

The input interface 410 may manage input signaling for the system 405. For example, the input interface 410 may receive input signaling (e.g., messages, packets, data, instructions, commands, transactions, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the wallet manager 420 to support managing crypto deposits via a non-custodial escrow. In some cases, the input interface 410 may be a component of a network interface 625 as described with reference to FIG. 6.

The output interface 415 may manage output signaling for the system 405. For example, the output interface 415 may receive signaling from other components of the system 405, such as the wallet manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the wallet manager 420 may include a smart contract manager 425, an input receiving manager 430, a payload signing manager 435, a blockchain message broadcasting manager 440, or any combination thereof. In some examples, the wallet manager 420, or various components thereof, may be configured to perform various operations (e.g., receiving, monitoring, transmitting) using or otherwise in cooperation with the input interface 410, the output interface 415, or both. For example, the wallet manager 420 may receive information from the input interface 410, send information to the output interface 415, or be integrated in combination with the input interface 410, the output interface 415, or both to receive information, transmit information, or perform various other operations as described herein.

The smart contract manager 425 may be configured as or otherwise support a means for deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list. The input receiving manager 430 may be configured as or otherwise support a means for receiving, at the custodial token platform, a set of inputs associated with the first user profile, wherein the set of inputs are indicative of a transfer of a second type of crypto token of the one or more second types of crypto tokens to the smart contract address. The payload signing manager 435 may be configured as or otherwise support a means for signing, after receiving the set of inputs and using a private key of the custodial token platform, a payload comprising at least a destination address and an identifier for the second type of crypto token, the private key associated with a public key that is accessible by the first smart contract. The blockchain message broadcasting manager 440 may be configured as or otherwise support a means for broadcasting, via the blockchain network comprising the plurality of nodes, a blockchain message that calls the second function and transfers the second type of crypto token to the destination address.

Figure 5:
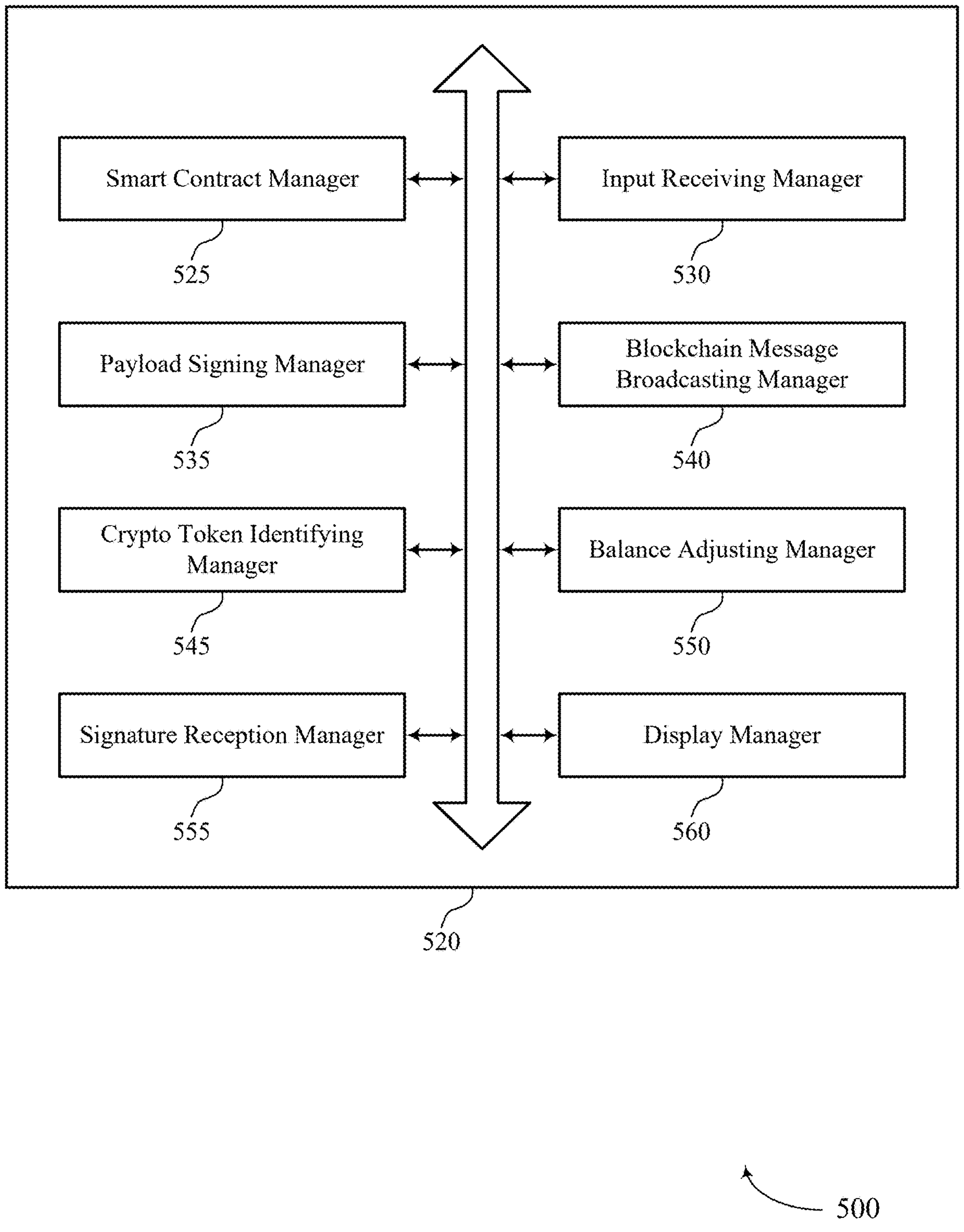
FIG. 5 shows a block diagram of a wallet manager that supports managing crypto deposits via a non-custodial escrow in accordance with aspects of the present disclosure.

FIG. 5 shows a block diagram 500 of a wallet manager 520 that supports managing crypto deposits via a non-custodial escrow in accordance with aspects of the present disclosure. The wallet manager 520 may be an example of aspects of a wallet manager or a wallet manager 420, or both, as described herein. The wallet manager 520, or various components thereof, may be an example of means for performing (e.g., to cause the wallet manager 520 to perform) various aspects of managing crypto deposits via a non-custodial escrow as described herein. For example, the wallet manager 520 may include a smart contract manager 525, an input receiving manager 530, a payload signing manager 535, a blockchain message broadcasting manager 540, a crypto token identifying manager 545, a balance adjusting manager 550, a signature reception manager 555, a display manager 560, or any combination thereof. Each of these components, or components of subcomponents thereof (e.g., one or more processors, one or more memories), may communicate, directly or indirectly, with one another (e.g., via one or more buses).

The smart contract manager 525 may be configured as or otherwise support a means for deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list. The input receiving manager 530 may be configured as or otherwise support a means for receiving, at the custodial token platform, a set of inputs associated with the first user profile, wherein the set of inputs are indicative of a transfer of a second type of crypto token of the one or more second types of crypto tokens to the smart contract address. The payload signing manager 535 may be configured as or otherwise support a means for signing, after receiving the set of inputs and using a private key of the custodial token platform, a payload comprising at least a destination address and an identifier for the second type of crypto token, the private key associated with a public key that is accessible by the first smart contract. The blockchain message broadcasting manager 540 may be configured as or otherwise support a means for broadcasting, via the blockchain network comprising the plurality of nodes, a blockchain message that calls the second function and transfers the second type of crypto token to the destination address.

In some examples, the crypto token identifying manager 545 may be configured as or otherwise support a means for identifying, based on monitoring the blockchain network, a transfer of a first type of crypto token of the one or more first types of crypto token to the smart contract address. In some examples, the balance adjusting manager 550 may be configured as or otherwise support a means for adjusting, after identifying the transfer of the first type of crypto token to the smart contract address and prior to transfer of the first type of crypto token to the blockchain address of the custodial token platform, an amount of the first type of crypto token associated with the first user profile of the custodial token platform.

In some examples, the blockchain message broadcasting manager 540 may be configured as or otherwise support a means for broadcasting a second blockchain message that calls the first function and transfers the first type of crypto token to the blockchain address of the custodial token platform.

In some examples, the crypto token identifying manager 545 may be configured as or otherwise support a means for identifying, based on monitoring the blockchain network, the transfer of the second type of crypto token to the smart contract address.

In some examples, the signature reception manager 555 may be configured as or otherwise support a means for receiving, at the custodial token platform after receiving the set of inputs associated with the first user profile, a signature associated with the destination address, wherein the signature indicates that a user associated with the first user profile has access to a private key associated with the destination address, wherein the payload is signed after receiving the signature associated with the destination address.

In some examples, the display manager 560 may be configured as or otherwise support a means for displaying, to a user associated with the first user profile, a prompt for the user to provide the set of inputs, wherein receiving the set of inputs is in accordance with the prompt.

In some examples, displaying the prompt is in response to identifying the transfer of the second type of crypto token to the smart contract address.

In some examples, the set of inputs further comprises an amount of the second type of crypto token. In some examples, the blockchain message is configured to transfer the amount of the second type of crypto token to the custodial token platform.

In some examples, the set of inputs comprises the destination address, the identifier for the second type of crypto token, and a user authorization to transfer the second type of crypto token to the destination address.

Figure 6:
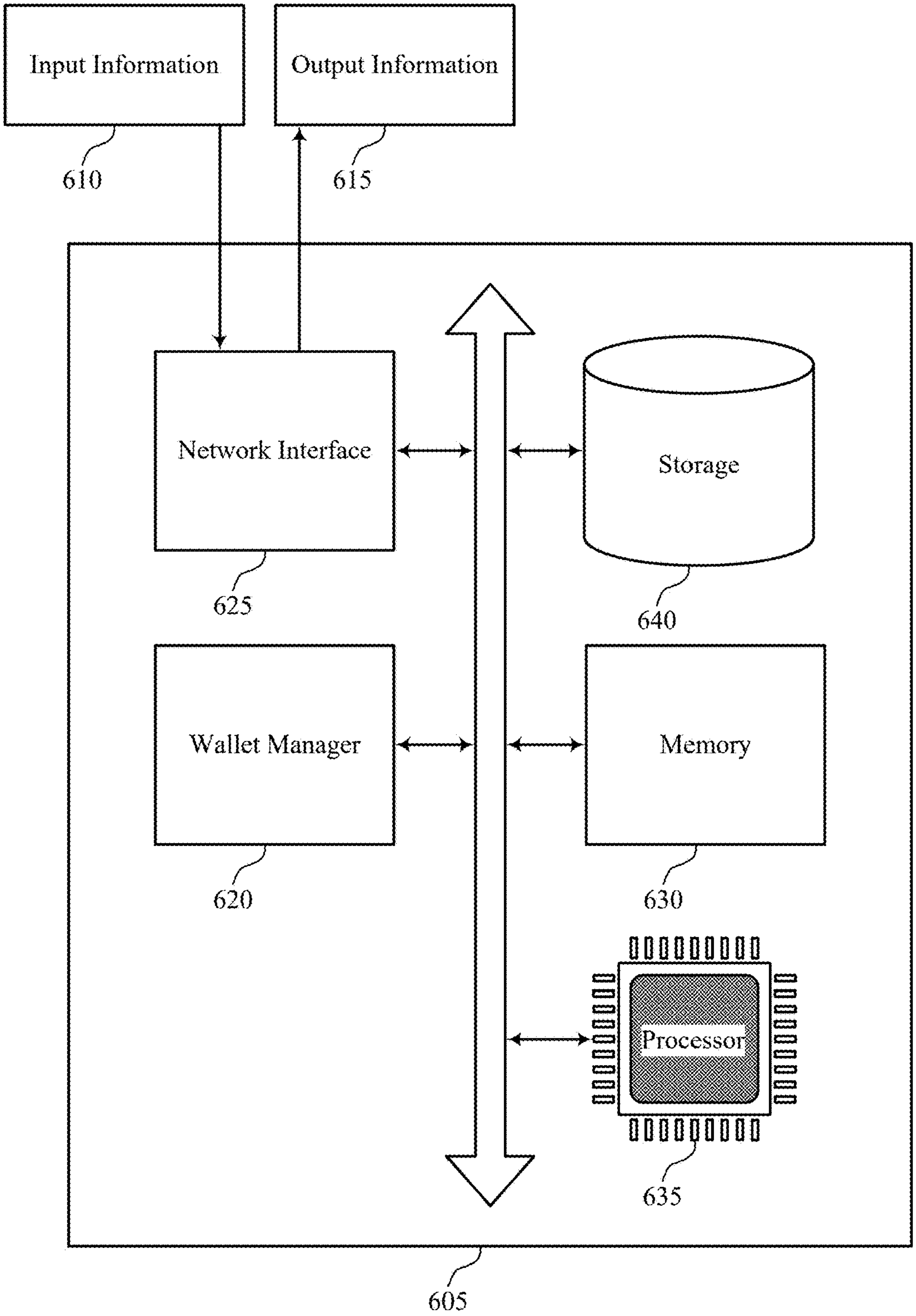
FIG. 6 shows a diagram of a system including a device that supports managing crypto deposits via a non-custodial escrow in accordance with aspects of the present disclosure.

FIG. 6 shows a diagram of a system 600 including a system 605 that supports managing crypto deposits via a non-custodial escrow in accordance with aspects of the present disclosure. The system 605 may be an example of or include components of a system 405 as described herein. The system 605 may include components blockchain network interaction, user interaction, etc., such as a wallet manager 620, an input information 610, an output information 615, a network interface 625, at least one memory 630, at least one processor 635, and a storage 640. Each of these components may be in communication with one another (e.g., via one or more buses).

The network interface 625 may enable the system 605 to exchange information (e.g., input information 610, output information 615, or both) with other systems or devices (not shown). For example, the network interface 625 may enable the system 605 to connect to a network (e.g., a network 135 as described herein). The network interface 625 may include one or more wireless network interfaces, one or more wired network interfaces, or any combination thereof.

Memory 630 may include RAM, ROM, or both. The memory 630 may store computer-readable, computer-executable software including instructions that, when executed, cause at least one processor 635 to perform various functions described herein, such as functions supporting managing crypto deposits via a non-custodial escrow. In some cases, the memory 630 may contain, among other things, a basic input/output system (BIOS), which may control basic hardware or software operation such as the interaction with peripheral components or devices. In some cases, the memory 630 may be an example of aspects of one or more components of a custodial token platform 110 as described with reference to FIG. 1. The memory 630 may be an example of a single memory or multiple memories. For example, the system 605 may include one or more memories 630.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in at least one memory 630 to perform various functions (e.g., functions or tasks supporting managing crypto deposits via a non-custodial escrow). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. The processor 635 may be an example of a single processor or multiple processors. For example, the system 605 may include one or more processors 635.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1.

For example, the wallet manager 620 may be configured as or otherwise support a means for deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list. The wallet manager 620 may be configured as or otherwise support a means for receiving, at the custodial token platform, a set of inputs associated with the first user profile, wherein the set of inputs are indicative of a transfer of a second type of crypto token of the one or more second types of crypto tokens to the smart contract address. The wallet manager 620 may be configured as or otherwise support a means for signing, after receiving the set of inputs and using a private key of the custodial token platform, a payload comprising at least a destination address and an identifier for the second type of crypto token, the private key associated with a public key that is accessible by the first smart contract. The wallet manager 620 may be configured as or otherwise support a means for broadcasting, via the blockchain network comprising the plurality of nodes, a blockchain message that calls the second function and transfers the second type of crypto token to the destination address.

By including or configuring the wallet manager 620 in accordance with examples as described herein, the system 605 may support techniques for transferring crypto tokens according to an escrow associated with a smart contract, which may enable improved reliability of crypto transactions, reduced latency, and improved user experience.

Figure 7:
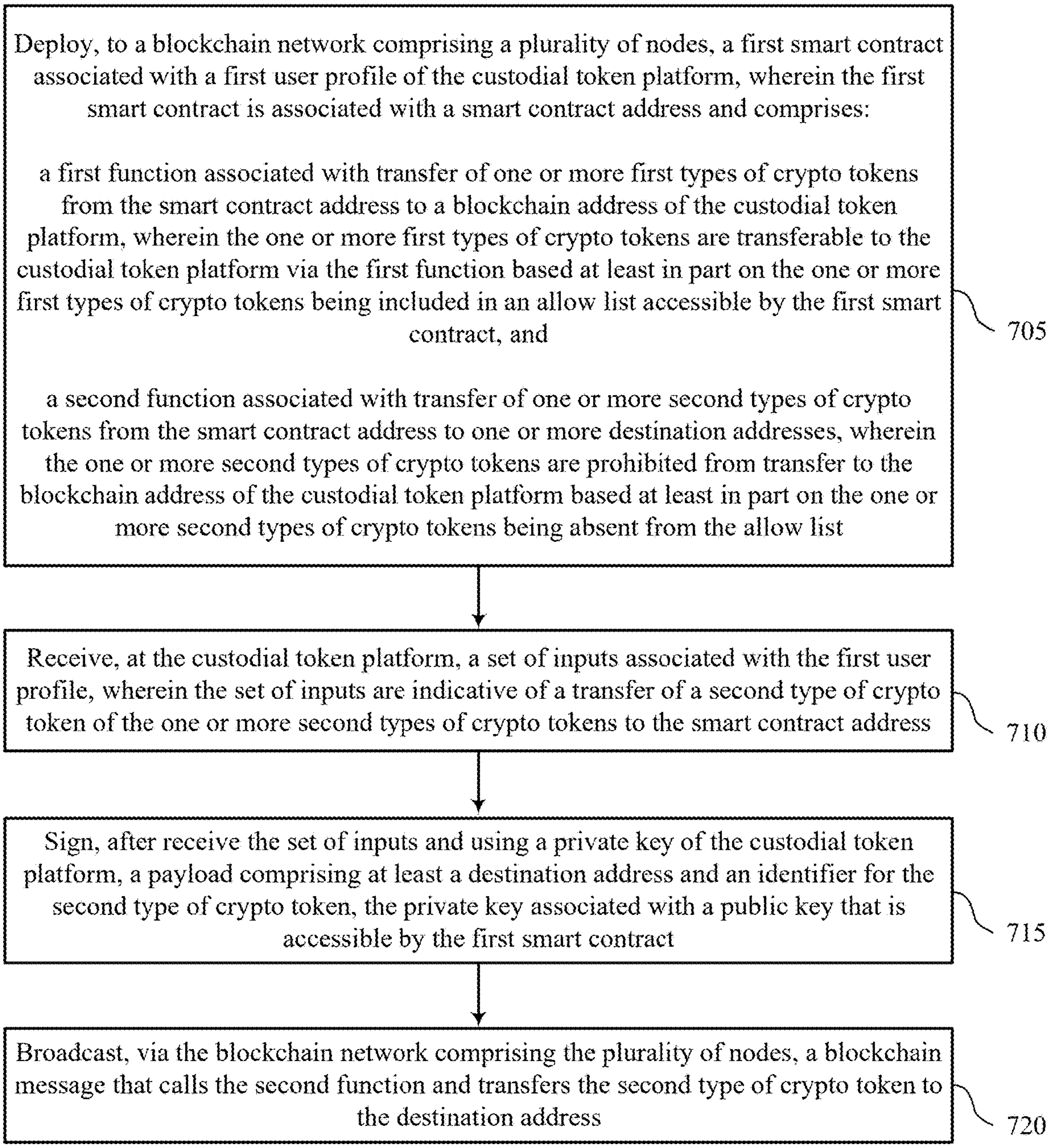
FIGS. 7 through 9 show flowcharts illustrating methods that support managing crypto deposits via a non-custodial escrow in accordance with aspects of the present disclosure.

FIG. 7 shows a flowchart illustrating a method 700 that supports managing crypto deposits via a non-custodial escrow in accordance with aspects of the present disclosure. The operations of the method 700 may be implemented by a custodial token platform or its components as described herein. For example, the operations of the method 700 may be performed by a custodial token platform as described with reference to FIGS. 1 through 6. In some examples, a custodial token platform may execute a set of instructions to control the functional elements of the custodial token platform to perform the described functions. Additionally, or alternatively, the custodial token platform may perform aspects of the described functions using special-purpose hardware.

At 705, the method may include deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list. The operations of 705 may be performed in accordance with examples as disclosed herein. In some examples, aspects of the operations of 705 may be performed by a smart contract manager 525.

At 710, the method may include receiving, at the custodial token platform, a set of inputs associated with the first user profile, wherein the set of inputs are indicative of a transfer of a second type of crypto token of the one or more second types of crypto tokens to the smart contract address. The operations of 710 may be performed in accordance with examples as disclosed herein. In some examples, aspects of the operations of 710 may be performed by an input receiving manager 530.

At 715, the method may include signing, after receiving the set of inputs and using a private key of the custodial token platform, a payload comprising at least a destination address and an identifier for the second type of crypto token, the private key associated with a public key that is accessible by the first smart contract. The operations of 715 may be performed in accordance with examples as disclosed herein. In some examples, aspects of the operations of 715 may be performed by a payload signing manager 535.

At 720, the method may include broadcasting, via the blockchain network comprising the plurality of nodes, a blockchain message that calls the second function and transfers the second type of crypto token to the destination address. The operations of 720 may be performed in accordance with examples as disclosed herein. In some examples, aspects of the operations of 720 may be performed by a blockchain message broadcasting manager 540.

Figure 8:
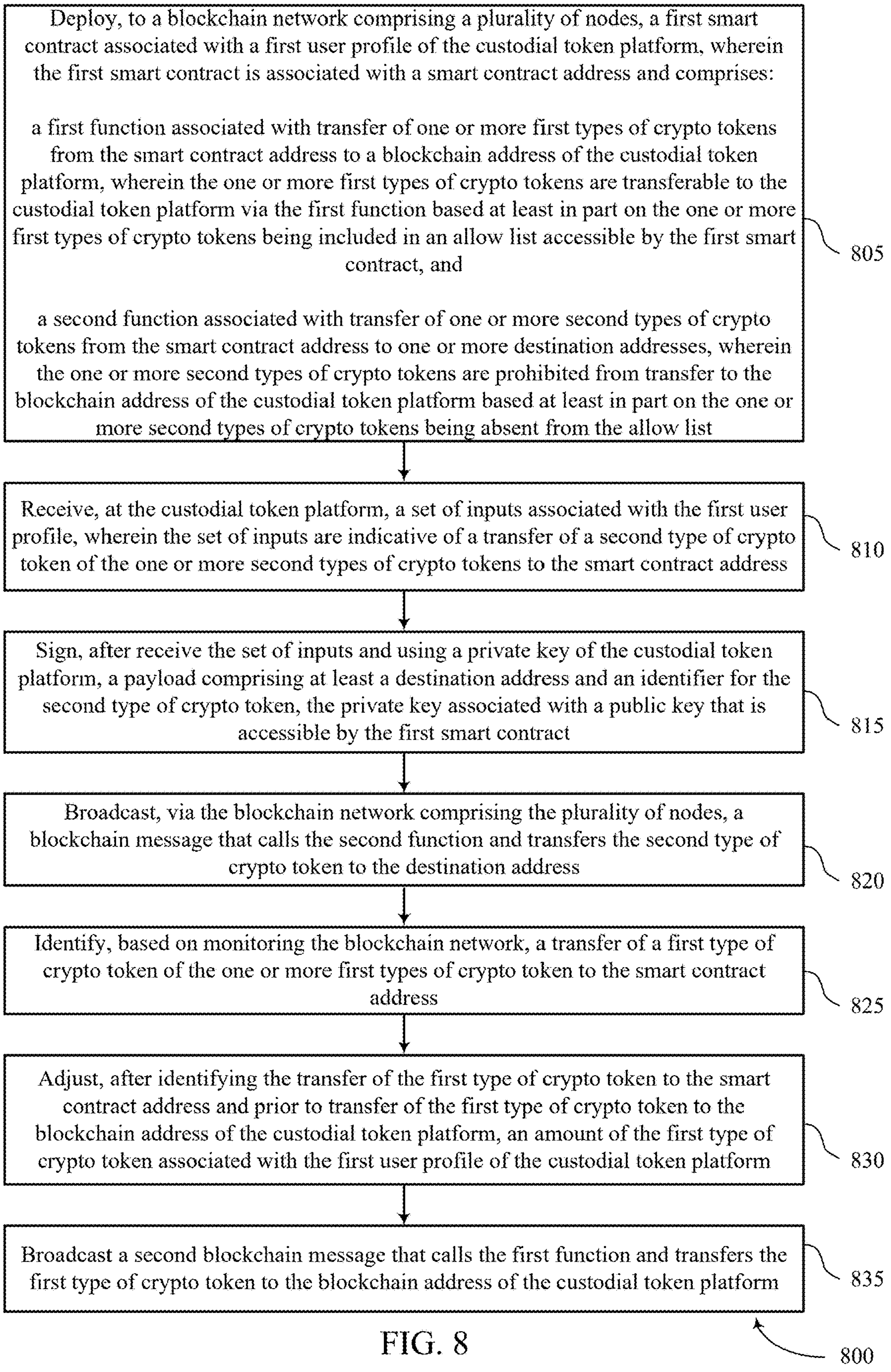

FIG. 8 shows a flowchart illustrating a method 800 that supports managing crypto deposits via a non-custodial escrow in accordance with aspects of the present disclosure. The operations of the method 800 may be implemented by a custodial token platform or its components as described herein. For example, the operations of the method 800 may be performed by a custodial token platform as described with reference to FIGS. 1 through 6. In some examples, a custodial token platform may execute a set of instructions to control the functional elements of the custodial token platform to perform the described functions. Additionally, or alternatively, the custodial token platform may perform aspects of the described functions using special-purpose hardware.

At 805, the method may include deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list. The operations of 805 may be performed in accordance with examples as disclosed herein. In some examples, aspects of the operations of 805 may be performed by a smart contract manager 525.

At 810, the method may include receiving, at the custodial token platform, a set of inputs associated with the first user profile, wherein the set of inputs are indicative of a transfer of a second type of crypto token of the one or more second types of crypto tokens to the smart contract address. The operations of 810 may be performed in accordance with examples as disclosed herein. In some examples, aspects of the operations of 810 may be performed by an input receiving manager 530.

At 815, the method may include signing, after receiving the set of inputs and using a private key of the custodial token platform, a payload comprising at least a destination address and an identifier for the second type of crypto token, the private key associated with a public key that is accessible by the first smart contract. The operations of 815 may be performed in accordance with examples as disclosed herein. In some examples, aspects of the operations of 815 may be performed by a payload signing manager 535.

At 820, the method may include broadcasting, via the blockchain network comprising the plurality of nodes, a blockchain message that calls the second function and transfers the second type of crypto token to the destination address. The operations of 820 may be performed in accordance with examples as disclosed herein. In some examples, aspects of the operations of 820 may be performed by a blockchain message broadcasting manager 540.

At 825, the method may include identifying, based on monitoring the blockchain network, a transfer of a first type of crypto token of the one or more first types of crypto token to the smart contract address. The operations of 825 may be performed in accordance with examples as disclosed herein. In some examples, aspects of the operations of 825 may be performed by a crypto token identifying manager 545.

At 830, the method may include adjusting, after identifying the transfer of the first type of crypto token to the smart contract address and prior to transfer of the first type of crypto token to the blockchain address of the custodial token platform, an amount of the first type of crypto token associated with the first user profile of the custodial token platform. The operations of 830 may be performed in accordance with examples as disclosed herein. In some examples, aspects of the operations of 830 may be performed by a balance adjusting manager 550.

At 835, the method may include broadcasting a second blockchain message that calls the first function and transfers the first type of crypto token to the blockchain address of the custodial token platform. The operations of 835 may be performed in accordance with examples as disclosed herein. In some examples, aspects of the operations of 835 may be performed by a blockchain message broadcasting manager 540.

Figure 9:
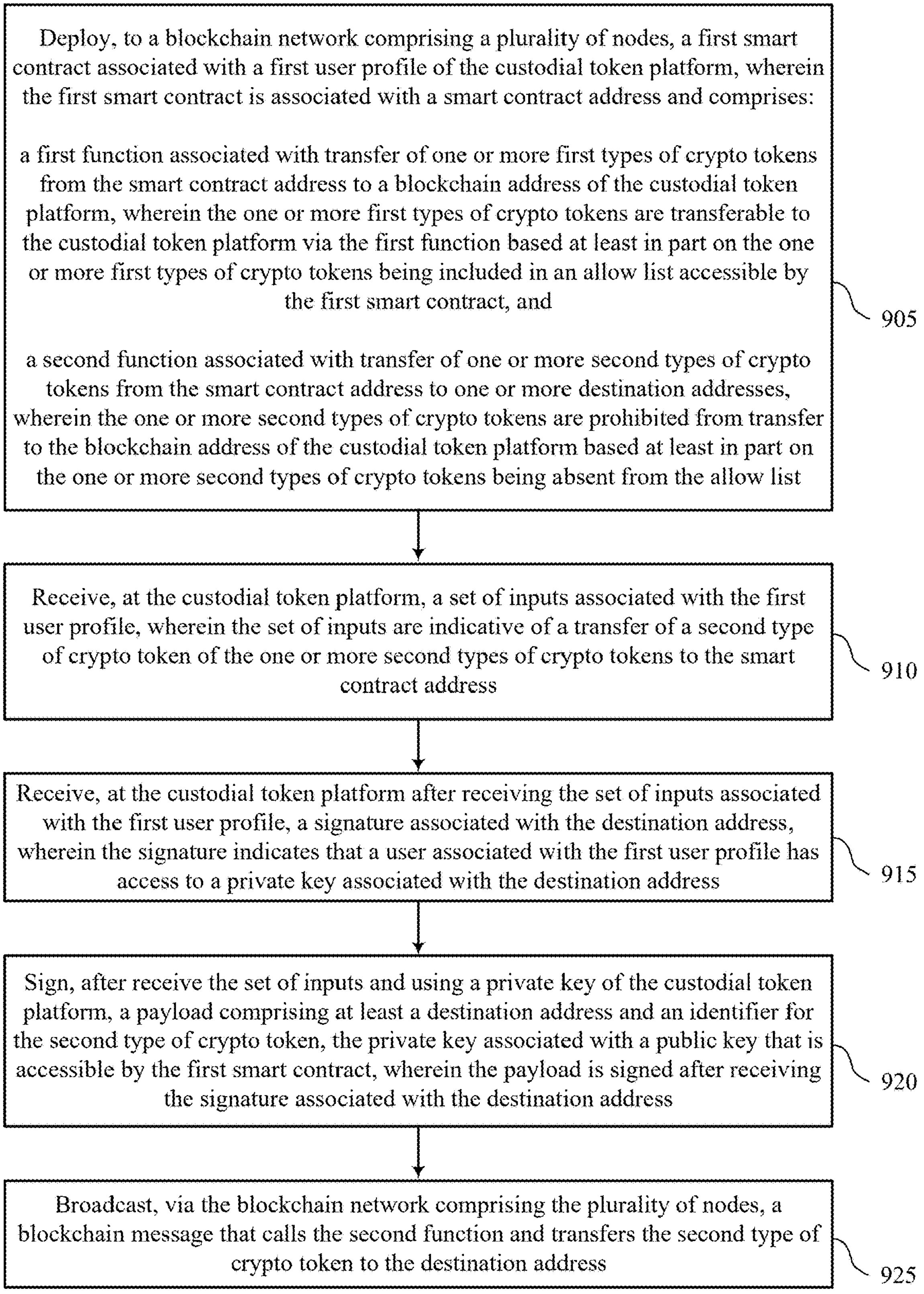

FIG. 9 shows a flowchart illustrating a method 900 that supports managing crypto deposits via a non-custodial escrow in accordance with aspects of the present disclosure. The operations of the method 900 may be implemented by a custodial token platform or its components as described herein. For example, the operations of the method 900 may be performed by a custodial token platform as described with reference to FIGS. 1 through 6. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list. The operations of 905 may be performed in accordance with examples as disclosed herein. In some examples, aspects of the operations of 905 may be performed by a smart contract manager 525.

At 910, the method may include receiving, at the custodial token platform, a set of inputs associated with the first user profile, wherein the set of inputs are indicative of a transfer of a second type of crypto token of the one or more second types of crypto tokens to the smart contract address. The operations of 910 may be performed in accordance with examples as disclosed herein. In some examples, aspects of the operations of 910 may be performed by an input receiving manager 530.

At 915, the method may include receiving, at the custodial token platform after receiving the set of inputs associated with the first user profile, a signature associated with the destination address, wherein the signature indicates that a user associated with the first user profile has access to a private key associated with the destination address, wherein the payload is signed after receiving the signature associated with the destination address. The operations of 915 may be performed in accordance with examples as disclosed herein. In some examples, aspects of the operations of 915 may be performed by a signature reception manager 555.

At 920, the method may include signing, after receiving the set of inputs and using a private key of the custodial token platform, a payload comprising at least a destination address and an identifier for the second type of crypto token, the private key associated with a public key that is accessible by the first smart contract. The operations of 920 may be performed in accordance with examples as disclosed herein. In some examples, aspects of the operations of 920 may be performed by a payload signing manager 535.

At 925, the method may include broadcasting, via the blockchain network comprising the plurality of nodes, a blockchain message that calls the second function and transfers the second type of crypto token to the destination address. The operations of 925 may be performed in accordance with examples as disclosed herein. In some examples, aspects of the operations of 925 may be performed by a blockchain message broadcasting manager 540.

A method by a custodial token platform is described. The method may include deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list, receiving, at the custodial token platform, a set of inputs associated with the first user profile, wherein the set of inputs are indicative of a transfer of a second type of crypto token of the one or more second types of crypto tokens to the smart contract address, signing, after receiving the set of inputs and using a private key of the custodial token platform, a payload comprising at least a destination address and an identifier for the second type of crypto token, the private key associated with a public key that is accessible by the first smart contract, and broadcasting, via the blockchain network comprising the plurality of nodes, a blockchain message that calls the second function and transfers the second type of crypto token to the destination address.

A custodial token platform is described. The custodial token platform may include one or more memories storing processor executable code, and one or more processors coupled with the one or more memories. The one or more processors may individually or collectively be operable to execute the code to cause the custodial token platform to deploy, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list, receive, at the custodial token platform, a set of inputs associated with the first user profile, wherein the set of inputs are indicative of a transfer of a second type of crypto token of the one or more second types of crypto tokens to the smart contract address, signing, after receive the set of inputs and using a private key of the custodial token platform, a payload comprising at least a destination address and an identifier for the second type of crypto token, the private key associated with a public key that is accessible by the first smart contract, and broadcast, via the blockchain network comprising the plurality of nodes, a blockchain message that calls the second function and transfers the second type of crypto token to the destination address.

Another custodial token platform is described. The custodial token platform may include means for deploying, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list, means for receiving, at the custodial token platform, a set of inputs associated with the first user profile, wherein the set of inputs are indicative of a transfer of a second type of crypto token of the one or more second types of crypto tokens to the smart contract address, means for signing, after receiving the set of inputs and using a private key of the custodial token platform, a payload comprising at least a destination address and an identifier for the second type of crypto token, the private key associated with a public key that is accessible by the first smart contract, and means for broadcasting, via the blockchain network comprising the plurality of nodes, a blockchain message that calls the second function and transfers the second type of crypto token to the destination address.

A non-transitory computer-readable medium storing code is described. The code may include instructions executable by one or more processors to deploy, to a blockchain network comprising a plurality of nodes, a first smart contract associated with a first user profile of the custodial token platform, wherein the first smart contract is associated with a smart contract address and comprises: a first function associated with transfer of one or more first types of crypto tokens from the smart contract address to a blockchain address of the custodial token platform, wherein the one or more first types of crypto tokens are transferable to the custodial token platform via the first function based at least in part on the one or more first types of crypto tokens being included in an allow list accessible by the first smart contract, and a second function associated with transfer of one or more second types of crypto tokens from the smart contract address to one or more destination addresses, wherein the one or more second types of crypto tokens are prohibited from transfer to the blockchain address of the custodial token platform based at least in part on the one or more second types of crypto tokens being absent from the allow list, receive, at the custodial token platform, a set of inputs associated with the first user profile, wherein the set of inputs are indicative of a transfer of a second type of crypto token of the one or more second types of crypto tokens to the smart contract address, signing, after receive the set of inputs and using a private key of the custodial token platform, a payload comprising at least a destination address and an identifier for the second type of crypto token, the private key associated with a public key that is accessible by the first smart contract, and broadcast, via the blockchain network comprising the plurality of nodes, a blockchain message that calls the second function and transfers the second type of crypto token to the destination address.

Some examples of the method, custodial token platforms, and non-transitory computer-readable medium described herein may further include operations, features, means, or instructions for identifying, based on monitoring the blockchain network, a transfer of a first type of crypto token of the one or more first types of crypto token to the smart contract address and adjusting, after identifying the transfer of the first type of crypto token to the smart contract address and prior to transfer of the first type of crypto token to the blockchain address of the custodial token platform, an amount of the first type of crypto token associated with the first user profile of the custodial token platform.

Some examples of the method, custodial token platforms, and non-transitory computer-readable medium described herein may further include operations, features, means, or instructions for broadcasting a second blockchain message that calls the first function and transfers the first type of crypto token to the blockchain address of the custodial token platform.

Some examples of the method, custodial token platforms, and non-transitory computer-readable medium described herein may further include operations, features, means, or instructions for identifying, based on monitoring the blockchain network, the transfer of the second type of crypto token to the smart contract address.

Some examples of the method, custodial token platforms, and non-transitory computer-readable medium described herein may further include operations, features, means, or instructions for receiving, at the custodial token platform after receiving the set of inputs associated with the first user profile, a signature associated with the destination address, wherein the signature indicates that a user associated with the first user profile may have access to a private key associated with the destination address, wherein the payload may be signed after receiving the signature associated with the destination address.

Some examples of the method, custodial token platforms, and non-transitory computer-readable medium described herein may further include operations, features, means, or instructions for displaying, to a user associated with the first user profile, a prompt for the user to provide the set of inputs, wherein receiving the set of inputs may be in accordance with the prompt.

Some examples of the method, custodial token platforms, and non-transitory computer-readable medium described herein may further include operations, features, means, or instructions for displaying the prompt may be in response to identifying the transfer of the second type of crypto token to the smart contract address.

In some examples of the method, custodial token platforms, and non-transitory computer-readable medium described herein, the set of inputs further comprises an amount of the second type of crypto token and the blockchain message may be configured to transfer the amount of the second type of crypto token to the custodial token platform.

In some examples of the method, custodial token platforms, and non-transitory computer-readable medium described herein, the set of inputs comprises the destination address, the identifier for the second type of crypto token, and a user authorization to transfer the second type of crypto token to the destination address.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a custodial token platform, comprising:

deploying, by the custodial token platform and to a blockchain network comprising a plurality of nodes, a first smart contract associated with a first user profile of the custodial token platform, wherein the first smart contract is associated with a smart contract address and comprises:

a first function comprising executable code transferring one or more first types of crypto tokens from the smart contract address to a blockchain address of the custodial token platform for the one or more first types of crypto tokens that are included in an allow list accessible by the first smart contract, and a second function comprising executable code transferring one or more second types of crypto tokens from the smart contract address to one or more destination addresses that are external to the custodial token platform for the one or more second types of crypto tokens that are absent from the allow list;

monitoring the blockchain network, by the custodial token platform via one or more computing nodes of the custodial token platform, for transfers of crypto tokens to the smart contract address;

identifying, by the custodial token platform based at least in part on the monitoring, a transfer of a second type of crypto token of the one or more second types of crypto tokens to the smart contract address;

receiving, by the custodial token platform based at least in part on identifying the transfer of the second type of crypto token, a set of inputs associated with the first user profile, wherein the set of inputs are indicative of the transfer of the second type of crypto token of the one or more second types of crypto tokens to the smart contract address;

signing, by the custodial token platform after receiving the set of inputs and using a private key of the custodial token platform, a payload comprising at least a destination address of the one or more destination addresses and an identifier for the second type of crypto token, the private key associated with a public key that is accessible by the first smart contract; and transferring the second type of crypto token from the smart contract address to the destination address by:

broadcasting, by the custodial token platform via the blockchain network comprising the plurality of nodes, a blockchain message calling the second function based at least in part on the second type of crypto token being absent from the allow list.

2. The method of claim 1, further comprising:

identifying, based on monitoring the blockchain network, a transfer of a first type of crypto token of the one or more first types of crypto tokens to the smart contract address; and adjusting, after identifying the transfer of the first type of crypto token to the smart contract address and prior to transfer of the first type of crypto token to the blockchain address of the custodial token platform, an amount of the first type of crypto token associated with the first user profile of the custodial token platform.

3. The method of claim 1, further comprising:
broadcasting a second blockchain message that calls the first function and transfers a first type of crypto token of the one or more first types of crypto tokens to the blockchain address of the custodial token platform.

4. The method of claim 1, further comprising:
receiving, at the custodial token platform after receiving the set of inputs associated with the first user profile, a signature associated with the destination address, wherein the signature indicates that a user associated with the first user profile has access to a private key associated with the destination address, wherein the payload is signed after receiving the signature associated with the destination address.

5. The method of claim 1, further comprising:
displaying, to a user associated with the first user profile, a prompt for the user to provide the set of inputs, wherein receiving the set of inputs is in accordance with the prompt.

6. The method of claim 5, wherein displaying the prompt is in response to identifying the transfer of the second type of crypto token to the smart contract address.

7. The method of claim 1, wherein the set of inputs further comprises an amount of the second type of crypto token, the blockchain message transferring the amount of the second type of crypto token to the destination address.

8. The method of claim 1, wherein the set of inputs comprises the destination address, the identifier for the second type of crypto token, and a user authorization to transfer the second type of crypto token to the destination address.

9. The method of claim 1, wherein identifying the transfer of the second type of crypto token comprises:
identifying, by the custodial token platform based at least in part on the monitoring and based at least in part on the first smart contract comparing the second type of crypto token to the allow list, the transfer of the second type of crypto token to the smart contract address.

10. An apparatus, comprising:
one or more memories storing processor-executable code; and
one or more processors coupled with the one or more memories individually or collectively operable to execute the code to cause the apparatus to:
deploy, by a custodial token platform and to a blockchain network comprising a plurality of nodes, a first smart contract associated with a first user profile of the custodial token platform, wherein the first smart contract is associated with a smart contract address and comprises:
a first function comprising executable code transferring one or more first types of crypto tokens from the smart contract address to a blockchain address of the custodial token platform for the one or more first types of crypto tokens that are included in an allow list accessible by the first smart contract, and
a second function comprising executable code transferring one or more second types of crypto tokens from the smart contract address to one or more destination addresses that are external to the custodial token platform for the one or more second types of crypto tokens that are absent from the allow list;
monitor the blockchain network, by the custodial token platform via one or more computing nodes of the custodial token platform, for transfers crypto tokens to the smart contract address;
identify, by the custodial token platform based on monitoring the blockchain network, a transfer of a first type of crypto token of the one or more first types of crypto tokens to the smart contract address;
adjust, by the custodial token platform after identifying the transfer of the first type of crypto token to the smart contract address and prior to transfer of the first type of crypto token to the blockchain address of the custodial token platform, an amount of the first type of crypto token associated with the first user profile of the custodial token platform; and
transfer the first type of crypto token from the smart contract address to the blockchain address of the custodial token platform by:
broadcasting, by the custodial token platform via the blockchain network comprising the plurality of nodes, a blockchain message calling the first function, based at least in part on the first type of crypto token being on the allow list.

11. The apparatus of claim 10, wherein the one or more processors are further operable to cause the apparatus to:
receive, at the custodial token platform, a set of inputs associated with the first user profile, wherein the set of inputs are indicative of a transfer of a second type of crypto token of the one or more second types of crypto tokens to the smart contract address; and
sign, after receiving the set of inputs and using a private key of the custodial token platform, a payload comprising at least a destination address of the one or more destination addresses and an identifier for the second type of crypto token, the private key associated with a public key that is accessible by the first smart contract.

12. The apparatus of claim 11, wherein the one or more processors are further operable to cause the apparatus to:
broadcast, via the blockchain network comprising the plurality of nodes, a second blockchain message that calls the second function and transfers the second type of crypto token to the destination address.

13. The apparatus of claim 11, wherein the one or more processors are further operable to cause the apparatus to:
identify, based on monitoring the blockchain network, the transfer of the second type of crypto token to the smart contract address.

14. The apparatus of claim 11, wherein the one or more processors are further operable to cause the apparatus to:
receive, at the custodial token platform after receiving the set of inputs associated with the first user profile, a signature associated with the destination address, wherein the signature indicates that a user associated with the first user profile has access to a private key associated with the destination address, wherein the payload is signed after receiving the signature associated with the destination address.

15. The apparatus of claim 11, wherein the one or more processors are further operable to cause the apparatus to:
display, to a user associated with the first user profile, a prompt for the user to provide the set of inputs, wherein receiving the set of inputs is in accordance with the prompt.

16. The apparatus of claim 15, wherein displaying the prompt is in response to identifying the transfer of the second type of crypto token to the smart contract address.

17. The apparatus of claim 11, wherein the set of inputs further comprises an amount of the second type of crypto token, a second blockchain message transferring the amount of the second type of crypto token to the destination address.

18. The apparatus of claim 11, wherein the set of inputs comprises the destination address, the identifier for the second type of crypto token, and a user authorization to transfer the second type of crypto token to the destination address.

19. A non-transitory computer-readable medium storing code, the code comprising instructions executable by one or more processors to:

deploy, by a custodial token platform and to a blockchain network comprising a plurality of nodes, a first smart contract associated with a first user profile of the custodial token platform, wherein the first smart contract is associated with a smart contract address and comprises:

a first function comprising executable code transferring one or more first types of crypto tokens from the smart contract address to a blockchain address associated with a custodial wallet of the custodial token platform for the one or more first types of crypto tokens that are included in an allow list accessible by the first smart contract, the custodial wallet associated with the first user profile, and a second function comprising executable code transferring one or more second types of crypto tokens from the smart contract address to one or more destination addresses that are external to the custodial token platform for the one or more second types of crypto tokens that are absent from the allow list;

monitor the blockchain network, by the custodial token platform via one or more computing nodes of the custodial token platform, for transfers of crypto tokens to the smart contract address;

identify, by the custodial token platform based at least in part on the monitoring, a transfer of a second type of crypto token of the one or more second types of crypto tokens to the smart contract address;

receive, by the custodial token platform based at least in part on identifying the transfer of the second type of crypto token, a set of inputs associated with the first user profile, wherein the set of inputs are indicative of the transfer of the second type of crypto token of the one or more second types of crypto tokens to the smart contract address, wherein the set of inputs comprises a destination address of the one or more destination addresses, an identifier for the second type of crypto token, and a user authorization to transfer the second type of crypto token to the destination address;

receive, at the custodial token platform after receiving the set of inputs associated with the first user profile, a signature associated with the destination address, wherein the signature indicates that a user associated with the first user profile has access to a private key associated with the destination address;

sign, by the custodial token platform using a private key of the custodial token platform and associated with a public key accessible by the first smart contract and in accordance with the received signature, a payload comprising at least the destination address and the identifier for the second type of crypto token; and transfer the second type of crypto token to the destination address by: broadcasting, by the custodial token platform via the blockchain network comprising the plurality of nodes, a blockchain message calling the second function based at least in part on the second type of crypto token being absent from the allow list.

20. The non-transitory computer-readable medium of claim 19, wherein the code is further executable by the one or more processors to:

identify, based on monitoring the blockchain network, a transfer of a first type of crypto token of the one or more first types of crypto token to the smart contract address; and adjust, after identifying the transfer of the first type of crypto token to the smart contract address and prior to transfer of the first type of crypto token to the blockchain address of the custodial token platform, an amount of the first type of crypto token associated with the first user profile of the custodial token platform.

* * * * *